United States Patent [19]
Racz

[11] 3,788,513
[45] Jan. 29, 1974

[54] LAMINATED COOKWARE

[76] Inventor: Nick S. Racz, 4800 Chicago Beach Dr., Chicago, Ill. 60645

[22] Filed: Jan. 15, 1970

[21] Appl. No.: 3,044

[52] U.S. Cl.............. 220/64, 117/70 C, 117/71, 117/75, 126/390, 161/196
[51] Int. Cl............................. B02d 20/14
[58] Field of Search...... 220/64, 63; 117/97, 75, 71, 117/70 C; 126/390; 161/189, 192, 196, 213

[56] References Cited
UNITED STATES PATENTS

| | | | |
|---|---|---|---|
| 3,241,545 | 3/1966 | Reinert et al. | 220/64 X |
| 2,057,254 | 10/1936 | Sommer | 220/64 |
| 2,511,404 | 6/1950 | Glenkey et al. | 220/64 X |
| 2,975,072 | 3/1961 | Bryant et al. | 117/97 X |
| 3,393,086 | 7/1968 | Keating | 220/64 X |
| 2,841,137 | 7/1958 | Chace | 220/63 X |
| 3,511,690 | 5/1970 | Aharoni | 220/64 X |
| 3,419,414 | 12/1968 | Marks | 117/75 X |
| 3,143,241 | 8/1964 | Howell | 220/64 |
| 2,967,134 | 1/1961 | Scavullo | 126/390 X |
| 3,338,732 | 8/1967 | Holcomb | 117/70 C X |

Primary Examiner—George E. Lowrance
Assistant Examiner—Stephen Marcus
Attorney, Agent, or Firm—Molinare, Allegretti, Newitt & Witcoff

[57] ABSTRACT

A multiple ply laminated cookware container includes a core ply of high strength and relatively low thermal conductivity, such as carbon steel, which is sandwiched between non-ferrous plies, such as aluminum. A frit anchor ply may be bonded upon the aluminum ply nearest the interior of the container and a non-stick coating, such as Teflon may be bonded to the frit ply. Preferably, a decorative coating, such as a porcelain enamel, is bonded to the aluminum ply nearest the exterior of the container. The thickness of the steel and non-ferrous plies may be varied so as to suit structural as well as thermal qualities of given areas of the container.

17 Claims, 2 Drawing Figures

PATENTED JAN 29 1974 3,788,513

INVENTOR.
NICK S. RACZ

BY Bair, Freeman & Molinare
ATTORNEYS

LAMINATED COOKWARE

BACKGROUND AND SUMMARY OF THE INVENTION

This invention relates to cookware and, more particularly, to laminated cookware containers.

Ideally, cookware containers should satisfy at least the following criteria: (1) the mechanical strength of the cookware must be sufficient to provide adequate support for the container and its contents, (2) the container surfaces must be non-toxic to permit the preparation of healthy non-contaminated dishes, (3) the container should resist both rust or oxidation and washing solutions, (4) that portion of the container which is in contact with the source of heat for cooking should have a relatively high thermal conductivity to enhance heat transfer to the food being cooked so as to enable fast, economical and uniform heating of the food without degrading the non-stick finish and other coatings of the container, (5) that portion of the container not in contact with the source of heat for cooking should have a relatively low thermal conductivity to reduce heat losses from the food thus enabling fast and economical heating of the food, (6) the container should be easy to clean after use, (7) the container should resist wear well, (8) the container should have a pleasing aesthetic appearance, (9) the costs of the container should be low.

In view of some of these considerations, both aluminum and stainless steel cookware containers have come into widespread use. Aluminum containers have come to be preferred over those of stainless steel primarily because containers can be made of aluminum which satisfy a greater number of the above criteria for cookware containers than stainless steel containers at a cost less than that of the stainless steel.

An analysis of an aluminum cookware container based on the above list of cookware criteria will point out the relative advantages and disadvantages of this material. Aluminum if thick enough has sufficient mechanical strength for this purpose. It is non-toxic and provides some degree of resistance to oxidation and washing solutions. It has excellent thermal conductivity, thereby enhancing heat flow from the source to the food, but it does not retard heat losses through those parts of the container which are not in contact with the heat source. It is not particularly easy to clean, and has a tendency to stain or discolor in normal use. It is fairly wear resistant. It can be made fairly pleasing in appearance initially, but the tendency to stain mentioned above, and the tendency of the surface to dull with time and use make it less desirable than stainless steel, glass or other ceramics from this standpoint. The costs of aluminum containers are greater than, say, carbon steel but less than stainless steel.

A similar comparison for a stainless steel container shows its relative advantages and disadvantages. It has considerably greater mechanical strength than aluminum. It is non-toxic. It resists both oxidation and washing solutions. Its thermal conductivity is much poorer than that of aluminum, thus it does not provide as good heat flow from the heat source to the food as aluminum, but it does somewhat retard heat losses through those parts of the container not in contact with the source. It is somewhat easier to clean than aluminum, but the removal of baked on food may still be quite difficult. Its resistance to wear is very good. It can be made with a bright finish which is pleasing in appearance, and will not dull or stain appreciably with age or use. Finally, the costs of stainless steel containers are, as noted above, higher even than those of aluminum.

Because of some, though not necessarily all, of the short-comings of the various materials used in cookware container manufacture, the manufacturers of these containers have resorted to several means to improve their products and more closely match the ideal container criteria. Since the major disadvantage of mild steel as a material for cookware containers is its tendency to rust, those manufacturers who use it have completely covered the container with some material which is wear resistant, and protects the steel from contact with oxygen, such as various enamels, etc. However, there is as yet no such covering that can not be chipped or cut through, thus exposing the mild steel beneath and permitting rust to begin.

Manufacturers who use aluminum frequently coat the exterior of their containers with a finish which is decorative, stain resistant, and easier to clean than the aluminum, thus improving the quality of their ware with respect to two of the criteria listed in a single operation. They also may coat the interior of the container with a non-stick finish, such as a member of the polytetraflouroethylene (P.T.F.E.) family, which makes the container much easier to clean, and, since these coatings are available in different colors, may also enhance the apearance of the container. Since it can be supplied with a lasting attractive looking finish, stainless steel does not need to be given a decorative exterior coat. The ease of cleaning stainless steel containers would, however, be greatly improved if they could be coated on the interior with a non-stick finish, but stainless steel is not nearly as good a substrate for these types of finishes as is aluminum.

Thus, it is seen that of these three major cookware container materials, steel, aluminum, and stainless steel, aluminum is the most amenable to improvement by the application of different types of finishes. However, this improvement is not without its price. One serious disadvantage occurs when the decorative finish applied to the exterior of the container is a porcelain enamel. In order to provide an adequate finish with this type of enamel, the coated container must be heated to a temperature in excess of 1000°F. Commercially pure aluminum, such as is used for cookware, becomes metallurgically annealed and loses a substantial portion of its strength at such elevated temperatures. The loss of tensile strength may lead to excessive deformation of the ware in firing, or render it incapable of withstanding normal use. Accordingly, to compensate for this strength loss, the thickness of the aluminum must be increased to as much as 2.5 to 3.0 mm., resulting in an increased usage of the relatively expensive material. In order to overcome the need for increasing the thickness, various organic decorative coatings have been employed, such as thermalized nylon, polyamides, etc. These can be cured at a lower temperature of around 600°F. However, the saving realized by the elimination of the need for the extra metal is largely offset by the added cost differential between organic coating materials and inexpensive enamels.

Another approach to eliminate the need for using extra metal has been to use aluminum alloys which, though they anneal at the firing temperatures of porcelain enamels, subsequently harden after a period of time with age and exposure. Unfortunately, these alloys generally contain magnesium which is not compatible with porcelain enamels. Therefore, the alloys must be coated with a substance, such as commercially pure aluminum, in order to render the surface of the container compatible with the procelain coating. This type of construction requires the use of aluminum alloys which are also relatively expensive.

Certain problems have also been encountered with aluminum where it is desired to support and anchor a non-stick interior coating surface, such as Teflon. Such non-stick surfaces must be bonded to the base metal surface by way of physical rather than chemical bonds. More specifically, the bonding of non-stick coatings relies principally upon the flow of the coating material into pores and crests present upon the surface of the base metal. Consequently, it has been found desirable to increase the surface area of the base metal which is presented to the non-stick coating. The most widely used method of increasing the surface area has been by blasting so as to score the surface to form a plurality of peaks and pores which act as anchors for the non-stick coating.

However, such scoring alone results in an inferior bonding between the metal and non-stick coating since the firing temperatures of the coating soften the anchor peaks to the extent that the non-stick coating will not bond well with the scored surface. This problem is accentuated where it is desired to bond the non-stick coating to a blank prior to forming the blank into its final container shape.

In order to improve the quality of the bond between the non-stick coating and the aluminum ware, several approaches have been tried. One approach is to flame spray aluminum oxide particles, stainless steel particles or the like, on the aluminum to provide, in effect, a secondary anchor base for the non-stick coating which will not soften during firing. This approach has been generally unsatisfactory, however, particularly where mass production methods are to be employed because of high cost and the difficulty of controlling the grain size of the particles and the density of the hard base matrix. Another approach has been to fire bond a glass containing ceramic composition to the interior of the aluminum ware. This bonding method provides good results if coated on relatively pure aluminum, but it can not be used with the age hardening aluminum-magnesium alloys, since the ceramic composition is incompatible, as is porcelain, with such alloys.

Also where a non-stick coating is to be applied, it is important that local hot spots in the heated surface be eliminated. Such hot spots tend to occur in the same areas which are directly impinged by the cooking flame or which rest directly upon the cooking coils of the range. It is important to minimize these hot spots since the present non-stick coatings become unstable and are subject to deterioration when exposed to temperatures over about 500°F. for extended time periods.

The cookware containers of my invention overcome the aforementioned difficulties, and satisfy substantially all the criteria for an ideal container listed previously. In particular, the containers of my invention have adequate strength to withstand normal use and will not lose this strength if subjected to the elevated temperatures necessary to fire the exterior decorative coatings or interior coatings or both. The container surfaces are non-toxic and rust free even in the absence of exterior or interior coatings. The container resists both oxidation and washing solutions. The container can be manufactured with high thermal conductivity in that portion which is in direct contact with the heat source. The container can also be manufactured with a lower thermal conductivity in that portion which is not in contact with the heat source so as to retard heat losses through these areas. The container can be made quite easy to clean. The container can be made with good wear resistance. The container can be made with a pleasing aesthetic appearance. Finally, the container can satisfy all of the above criteria while having a lower cost than is possible with an aluminum or aluminum alloy container which satisfies only some of the same criteria.

BRIEF DESCRIPTION OF THE DRAWING

In the course of this detailed description, the drawing will frequently be referred to in which.

DETAILED DESCRIPTION OF THE PREFERRED EMBODIMENTS

Figure 1:
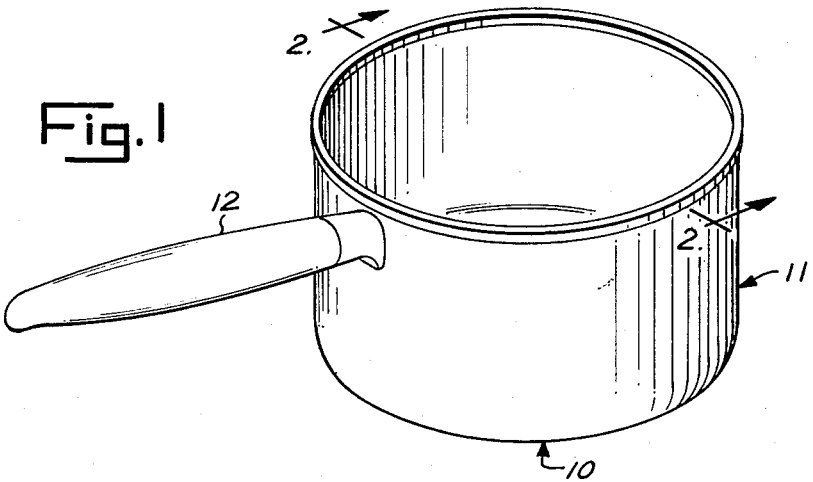
FIG. 1 is a perspective view of a cookware container in which the principles of my invention may be incorporated.

Referring to FIG. 1, a cooking container is shown having a substantially flat bottom wall 10, which is adapted to rest upon the burners or coils of a conventional gas or electric range (not shown) and an upstanding, generally circular sidewall 11 extending upward from the bottom wall to form a container for holding a volume of the foods, solids and/or liquids, which are to be heated. A conventional handle 12 may be attached to the sidewall 11 of the container to facilitate handling.

Figure 2:
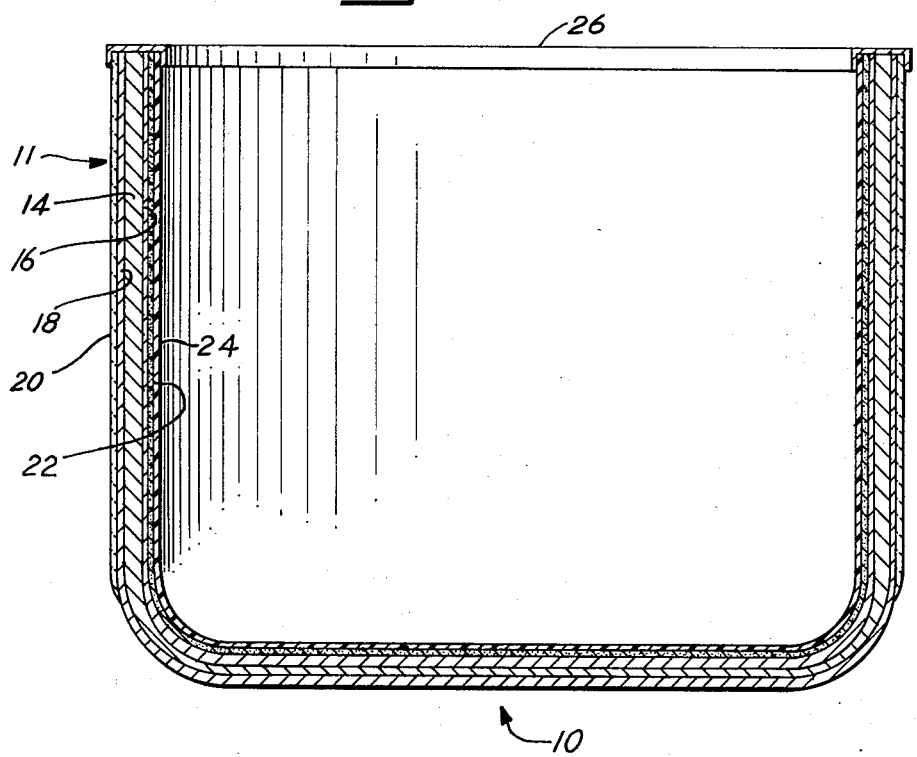
FIG. 2 is an enlarged cross-sectioned elevation view of the container taken along line 2 — 2 of FIG. 1.

Referring to FIG. 2, the construction of the bottom and sidewalls of the container is shown in detail. FIG. 2 is not intended to be to scale and is not drawn to scale, the overall thickness of the container walls as well as each of the plies or layers having been enlarged to show the details of my invention more clearly.

Each of the walls of the container comprises a mild or carbon steel core layer or ply 14. This core ply 14 is laminated between a pair of non-ferrous plies 16 and 18. Ply 16 is preferably aluminum so as to provide for the later bonding of a non-stick coating on the interior of the container. Ply 18 is also preferably aluminum, but may also be formed of other materials, such as stainless steel, particularly where no further exterior decorative coating is to be applied. Where plies 16 or 18 are of aluminum, the individual thickness of these plies may be of the order of ¼ - ⅜ mm. The term "non-ferrous" as employed herein is not intended to limit plies 16 and 18 only to materials which contain no iron, but may include various iron alloys which do not display the usual iron characteristics, e.g. rust, magnetism, etc., such as the stainless steel previously mentioned.

The exterior of the upstanding sidewall 11 may be coated with a decorative finish 20, which is preferably a porcelain or other ceramic material. Where an external decorative finish of porcelain is to be applied, ply 18 is preferably a commercially pure aluminum which exhibits suitable bonding properties with porcelain. Although porcelain is preferred as a decorative finish, various other decorative finishes may be employed, such as polyamides and other organic compositions as set forth earlier.

A non-stick finish may also be applied to the interior of the container. Any one of a number of non-stick finishes may be used, such as various members of the P.T.F.E. family, silicon base resins and the like. Prior to coating the interior of the container with the non-stick finish, ply 16 is made receptive, physically or chemically, to an anchor frit ply 22 which is coated upon and then heat bonded to ply 16 in order to provide a strong anchor base to which the non-stick coating 24 may be firmly bonded. The frit ply 22 is preferably somewhat discontinuous and is preferably one of the frits which are heat bonded to the interior surface of ply 16, such as the glass containing ceramic composition mentioned earlier. A suitable composition is CN-500 available from The Ferro Corporation, Cleveland, Ohio. The interior non-stick coating 24 is then applied to and firmly bonded to the discontinuous anchor ply as well as to the metal.

The upper edge of the container may be rolled over or covered with a corrosion resistant decorative channeled rim 26.

To form the laminated multiply container of my invention, the mild or carbon steel base core ply 14 is first coated on one or both sides with a thin layer or ply of the non-ferrous metal, such as aluminum. Any one of a number of well-known coating processes, such as spraying, dipping, cladding and the like may be employed. Where the exterior ply 18 is to be stainless steel, the stainless steel is deposited upon one side of the base core ply 14 and aluminum upon the other to form the interior ply 16. If the exterior is to be coated with a decorative coating 20, both plies 16 and 18 are preferably aluminum.

The anchor ply 22 is then coated upon ply 16 and the material is fired for the purpose of bonding the anchor ply to the aluminum ply 16. If the porcelain decorative coating 20 is to be employed, it may be coated on the external aluminum ply 18 prior to firing and both the frit ply 22 and the decorative coating may be fired together, since the bonding temperature of both is approximately the same, about 1050°F. The aforementioned interior coating steps may be performed either upon the blank form which the final container is to be later formed or upon a preformed container.

If a solid aluminum container, as employed is the past, was subjected to these heat bonding temperatures, the metal core of the container would have to be increased in thickness in order to compensate for the lost strength due to annealing of the aluminum at the elevated heat bonding temperatures of the coating, these temperatures being on the order of 750°F. – 1050°F., whereas the melting point of aluminum is only about 1220°F. However, in the laminated container of my invention, the aluminum plies 16 and 18 act primarily as bonding, heat conducting, and rust preventing layers and the container strength is provided by the relatively inexpensive steel base core ply 14, the strength of which is substantially unchanged at the above-mentioned temperatures. Thus, in the laminated container of my invention softening of the aluminum plies 16 and 18 is not an important consideration.

Once the frit anchor ply 22 has been heat bonded to ply 16, the non-stick coating 24 may be applied by any one of a number of well-known methods.

It will also be appreciated, that if, during use, either the decorative coating 20 or the non-stick coating 24 becomes scratched or chipped, the aluminum plies 16 or 18 will prevent exposure of the steel core 14, and avoid undesirable rust.

In addition to the aforementioned advantages, the laminated cookware of my invention may be readily adapted to optimize both the conductive and insulative qualities of the container while actually further improving the strength of the container. As set forth earlier, it is highly beneficial if the bottom wall 10 of the container is highly conductive in order to maximize heat transfer from the heat source to the food in the container and to reduce the possibility of hot spots which might occur in the container bottom with attendant possible damage to the coating and uneven heating of the food. It is also highly beneficial, if the sidewall 11 of the container, which is ordinarily not exposed to the heat source, is at least somewhat insulative in nature so as to minimize heat loss from the food through the walls of the container.

This may be readily accomplished in the laminated cookware of my invention by varying the thickness of any one or all of the plies 14, 16 and 18 between the sidewall 11 and bottom wall 10 of the container. For example, as shown in FIG. 2, the thickness of the steel core ply 14 may be increased so as to be greater in the upstanding sidewall 11 of the container than it is in the bottom wall 10. Conversely, the thickness of one or both of the aluminum plies 16 and 18 may be increased so as to be greater in the bottom wall 10 than in the sidewall 11. Accordingly, since steel has a relatively low thermal conductivity and aluminum a relatively high conductivity, heat transfer through the bottom of the container to the food is unimpeded and the probability of hot spots is reduced due to lateral conduction in plies 16 and 18 of the bottom wall 10. Heat transfer from the food through the sidewall 11 of the container is reduced because of the greater thickness of poorly conducting steel in this region. Moreover, by increasing the thickness of the core ply 14 in the sidewall 11, the strength of the sidewall of the container, which is exposed to the maximum lateral stresses, is further increased. In addition to the added insulative qualities realized by the increase in thickness of the steel core ply 14 and the decrease in thickness of the aluminum plies 16 and 18 in the sidewall, further insulation on the sidewalls is realized by way of the decorative ceramic coating 20, which itself acts as an insulator.

It should be understood that the embodiments of the invention which have been described are merely illustrative of some of the applications of the principles of the invention. Numerous modifications may be made by those skilled in the art without departing from the true spirit and scope of the invention.

What is claimed is:

1. A laminated multiply cookware container comprising:
   a cookware container which is adapted to be heated and having a bottom wall and a side wall, at least one of said walls including
   a first ply comprising a ferrous metal,
   continuous second and third metal plies, one of said second and third plies comprising aluminum and the other of said plies selected from the group consisting of aluminum and stainless steel, wherein the entire exterior part of said one of said plies is free of ferrous content, and wherein the metal of at least one of said second and third plies has a thermal conductivity greater than said ferrous metal and said first ply being sandwiched between said second and third plies, and a heat bonded inorganic coating ply bonded to said exterior part of said aluminum ply and on a face thereof remote from said first ply, said inorganic coating ply having a bonding temperature in excess of 750°F.

2. The container of claim 1 wherein said first ply comprises carbon steel.

3. The container of claim 1 wherein both of said second and third plies comprise aluminum.

4. The container of claim 1 wherein the one of said second and third plies nearest the exterior of said container comprises stainless steel and the other comprises aluminum.

5. The container of claim 1 wherein said heat bonded coating comprises an inorganic composition bonded to the one of said second and third plies nearest the exterior of said container.

6. The container of claim 5 wherein said inorganic composition is porcelain.

7. The container of claim 1 wherein said heat bonded coating ply comprises a frit on the one of said second and third plies nearest the interior of said container, and a non-stick ply coating the interior of said container and bonded to said frit coating.

8. The container of claim 1 wherein said metal of said second and third plies has a thermal conductivity substantially greater than said first ply, and the thickness of at least one of said second and third plies is greater in the area of said container which is to be exposed to the heat source than in the area of said container which is not exposed to the heat source.

9. The container of claim 8 wherein the thickness of said first ply is smaller in said first mentioned area than in said second mentioned area.

10. The container of claim 1 wherein the thickness of at least one of said plies varies in different areas of the container.

11. The container of claim 1 wherein the minimum thickness of said second and third plies is about ¼ mm.

12. A laminated multiply cookware container comprising in combination:

a first carbon steel ply, second and third aluminum plies with at least the entire exterior portion of each of such plies being free of ferrous content said first carbon steel ply being sandwiched between said aluminum plies, an inorganic heat bonded coating bonded to said exposed surface of the one of said aluminum plies nearest the exterior of said container, an inorganic anchor coating bonded to said exposed surface of the other of said aluminum plies nearest the interior of said container, a non-stick coating bonded to said anchor coating.

13. The container of claim 12 wherein the thickness of at least one of said aluminum plies is greater in the area of the container which is to be exposed to the heat source than in the area which is not exposed to the heat source and the thickness of the carbon steel ply is smaller in the first mentioned area than the last mentioned area.

14. The container of claim 12 wherein the minimum thickness of said second and third aluminum plies is about ¼ mm.

15. A laminated multiply cookware container comprising:

a first ply having a given thermal conductivity, a second ply laminated to said first ply, said second ply having a thermal conductivity which is substantially greater than said given conductivity of said first ply, the thickness of said second ply being greater in a first wall area of said container which is to be exposed to the heat source than in a second wall area of the container which is not exposed to the heat source, and the thickness of said first ply being greater in said second area than said first area, whereby the conductivity through said first wall area is substantially greater than through said second wall area.

16. The container of claim 15 wherein said first ply is a ferrous metal and said second ply is a non-ferrous metal.

17. The container of claim 16 wherein said second ply is aluminum.

* * * * *